United States Patent
Willis et al.

(10) Patent No.: US 7,549,756 B2
(45) Date of Patent: Jun. 23, 2009

(54) PIXEL SHIFTING COLOR PROJECTION SYSTEM

(75) Inventors: Donald Henry Willis, Indianapolis, IN (US); Billy Wesley Beyers, Carmel, IN (US); Estill Thone Hall, Jr., Fishers, IN (US); Michael Scott Deiss, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 247 days.

(21) Appl. No.: 10/575,445

(22) PCT Filed: Oct. 15, 2004

(86) PCT No.: PCT/US2004/034270

§ 371 (c)(1),
(2), (4) Date: Apr. 11, 2006

(87) PCT Pub. No.: WO2005/039191

PCT Pub. Date: Apr. 28, 2005

(65) Prior Publication Data

US 2007/0109502 A1 May 17, 2007

Related U.S. Application Data

(60) Provisional application No. 60/511,958, filed on Oct. 16, 2003, provisional application No. 60/511,872, filed on Oct. 16, 2003, provisional application No. 60/511,801, filed on Oct. 16, 2003.

(51) Int. Cl.
*G03B 21/28* (2006.01)

(52) U.S. Cl. .......................................... 353/84; 353/50

(58) Field of Classification Search .................... 353/38, 353/46, 30, 31, 50, 51, 84; 359/197, 209–212, 359/223, 225; 348/742, 743
See application file for complete search history.

(56) References Cited

U.S. PATENT DOCUMENTS

| | | | |
|---|---|---|---|
| 5,666,175 | A | 9/1997 | Spitzer et al. |
| 5,677,784 | A | 10/1997 | Harris |
| 6,038,004 | A | 3/2000 | Nanno et al. |
| 6,104,458 | A | 8/2000 | Fukuda |
| 6,231,189 | B1 | 5/2001 | Colucci et al. |

(Continued)

FOREIGN PATENT DOCUMENTS

EP 0733928 9/1996

(Continued)

OTHER PUBLICATIONS

Search Report Dated Feb. 3, 2005.

*Primary Examiner*—William C Dowling
(74) *Attorney, Agent, or Firm*—Robert D. Shedd; Harvey D. Fried; Patricia A. Verlangieri (57) ABSTRACT

A projection system including an integrator with an output end having a matrix of output windows therein. A pattern of red, green and blue monochromatic filters are disposed on the output windows passing a matrix of red, green, and blue monochromatic pixels of light. An imager modulates the pixels of monochromatic light A light shift device shifts the matrix of monochromatic pixels of light to temporally form a pattern of overlying pixels of light of different colors, viewable as a color image.

16 Claims, 11 Drawing Sheets

U.S. PATENT DOCUMENTS

| | | | |
|---|---|---|---|
| 6,700,095 B2 | 3/2004 | Sandstrom et al. | |
| 6,739,723 B1 * | 5/2004 | Haven et al. | 353/20 |
| 6,971,748 B2 * | 12/2005 | Cho et al. | 353/46 |
| 7,046,407 B2 * | 5/2006 | Conner | 359/15 |
| 7,113,231 B2 * | 9/2006 | Conner et al. | 349/5 |
| 7,182,463 B2 * | 2/2007 | Conner et al. | 353/31 |
| 7,255,448 B2 * | 8/2007 | Greer et al. | 353/84 |
| 7,258,451 B2 * | 8/2007 | Wang | 353/99 |
| 7,270,417 B2 * | 9/2007 | Choi et al. | 353/34 |
| 2002/0008812 A1 | 1/2002 | Conner et al. | |
| 2003/0058412 A1 | 3/2003 | Owen et al. | |
| 2006/0033887 A1 * | 2/2006 | Wang | 353/46 |
| 2007/0109502 A1 * | 5/2007 | Willis et al. | 353/32 |

FOREIGN PATENT DOCUMENTS

| | | |
|---|---|---|
| EP | 1098536 | 5/2001 |
| WO | WO 03/075083 | 9/2003 |

* cited by examiner

PIXEL SHIFTING COLOR PROJECTION SYSTEM

CROSS-REFERENCE TO RELATED APPLICATIONS

This application claims the benefit, under 35 U.S.C. § 365 of International Application PCT/US2004/034270, filed Oct. 15, 2004, which was published in accordance with PCT Article 21(2) on Apr. 28, 2005 in English and which claims the benefit of U.S. provisional patent application No. 60/511,801, filed Oct. 16, 2003; U.S. provisional patent application No. 60/511,958, filed Oct. 16, 2003; and U.S. provisional patent application No. 60/511,872, filed Oct. 16, 2003.

FIELD OF THE INVENTION

The invention is related generally to a projection system, and more particularly to a projection system including micro-displays wherein a pattern of discrete color pixels is shifted.

BACKGROUND

Micro-display projection systems using a reflective light engine or imager, such as digital light pulse (DLP) imager, are increasingly utilized in color image or video projection devices (e.g., rear projection television (RPTV)). In an existing projection system, shown in FIG. 1, a light source 10 is provided, in this case a UHP lamp generates white light (i.e., all color spectrums). Light from the light source 10 passes through a color wheel 20 which has a plurality of dichroic filtering elements, each of which allows a light band of one of the colors: blue, green and red to pass through and reflects light of the other colors. The color wheel 20 is rotated so that a temporal pattern of blue, green, and red light bands pass through the color wheel. The color wheel is typically rotated fast enough to create at least one primary color period for each primary color during each frame of a video image. Rotating the wheel faster, or using multiple filter segments for one or more of the primary colors can produce color separation artifacts that allow the viewer to detect the sequential color nature of the display system. For example, color breakup, also called the rainbow effect, is caused by light passing through a rotating color wheel with colors flashing sequentially and appears as a momentary flash of rainbow-like striping typically trailing bright objects when looking quickly from one side of a viewing screen to the other, or when quickly looking away from the viewing screen to an off-screen object. Additionally, color edge effects appearing as a flash of one of the three primary colors in the sequential color light beam at a leading edge of a moving object across the screen may also produce color separation artifacts.

Figure 1:
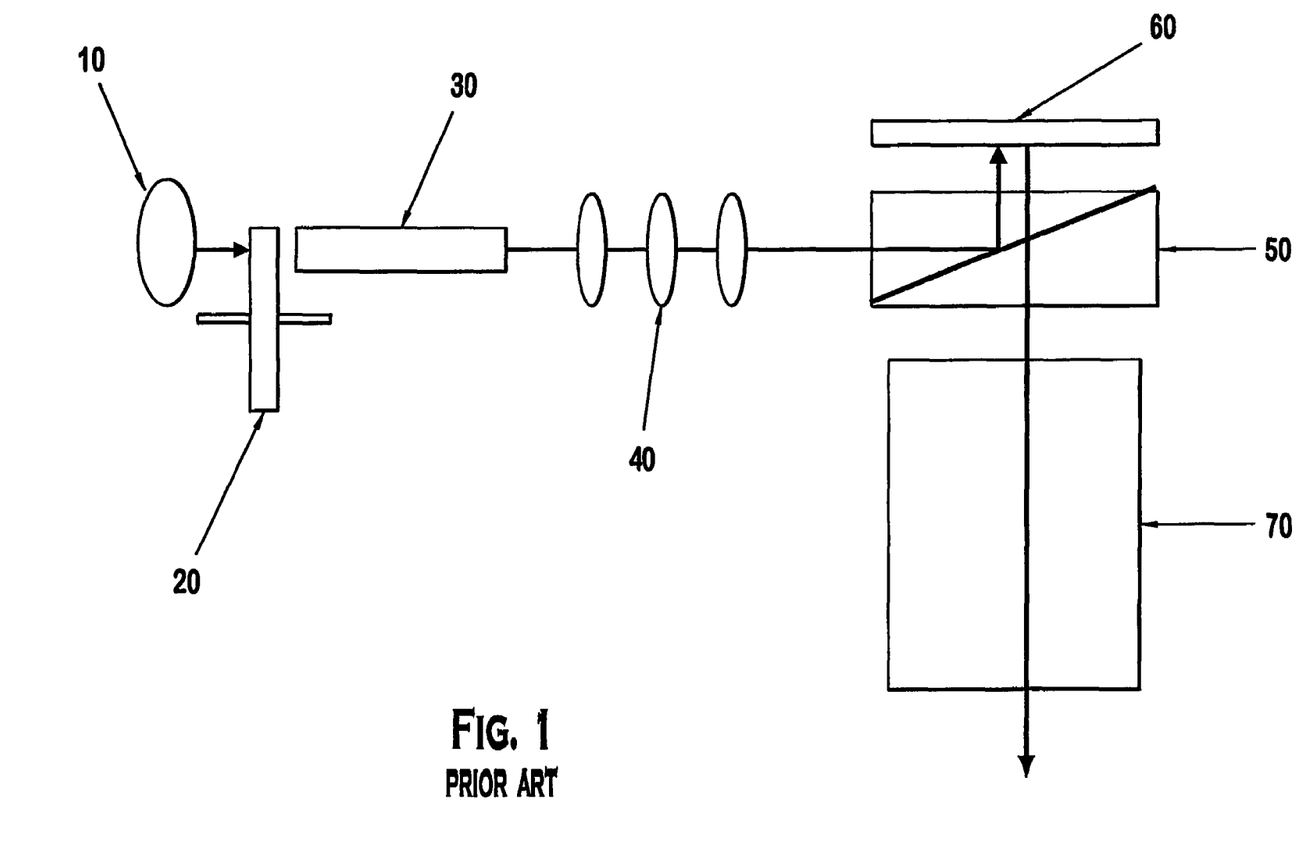
FIG. 1 shows a diagrammatic view of an existing digital light pulse (DLP) projection system.

An integrator 30 receives the light band from the light source 10 that is allowed to pass through the color wheel 20 and directs the light band through relay optics 40 into a total internal reflection (TIR) prism 50. The TIR prism 50 deflects the light band onto an imager 60, such as a DLP imager. The imager modulates the intensity of individual pixels of the light beam and reflects them back through the TIR prism 50 and into a projection lens system 70. The projection lens system 70 focuses the light pixels onto a screen (not shown) to form a viewable image. A color video image is formed by rapid successive matrices of pixels of each of the three colors (blue, green, and red) which are blended by the viewer's eye to form a full color image.

Throughout this specification, and consistent with the practice of the relevant art, the term pixel is used to designate a small area or dot of an image, the corresponding portion of a light transmission, and the portion of an imager producing that light transmission.

The DLP imager 60 comprises a matrix of micro-mirrors, moveable between an angle that reflects light through the TIR prism 50 and into the projection lens system 70 and an angle that deflects the light so that it is not projected by the projection lens system 70. Each micro-mirror reflects a pixel of light of a desired intensity depending upon a succession of angles of that particular micro-mirror which in turn are responsive to a video signal addressed to the DLP imager 60. Thus, in the DLP imager 60, each micro-mirror or pixel of the imager modulates the light incident on it according to a gray-scale factor input to the imager or light engine to form a matrix of discrete modulated light signals or pixels.

Existing DLP imagers, however, suffer from several problems. The color wheel wastes light, as the light having the colors that are reflected is typically lost. Also, color separation or break-up artifacts degrade the image quality of the projection system, as described above. Additionally, each micro-mirror may pivot up to twelve times for each of the three color bands for each frame, limiting the frame speed and adversely effecting mechanical reliability. As such, a system for reducing color separation or breakup artifacts and/or having improved resolution and improved reliability is needed.

SUMMARY

The present invention provides a projection system for projecting a full-color image using a micro-display with reduced mechanical motion and/or increased resolution. In an exemplary embodiment, the projection system has an integrator with an output end having a matrix of output windows therein. An imager modulates the pixels of light. A light shifting device shifts the matrix of pixels of light to temporally form a pattern of overlying monochromatic pixels of light of different colors, viewable as a color image and/or to project pixels of light between the positions of previously projected pixels of light to enhance resolution.

BRIEF DESCRIPTION OF THE DRAWINGS

The invention will now be described with reference to the accompanying figures of which.

DETAILED DESCRIPTION

Figure 2:
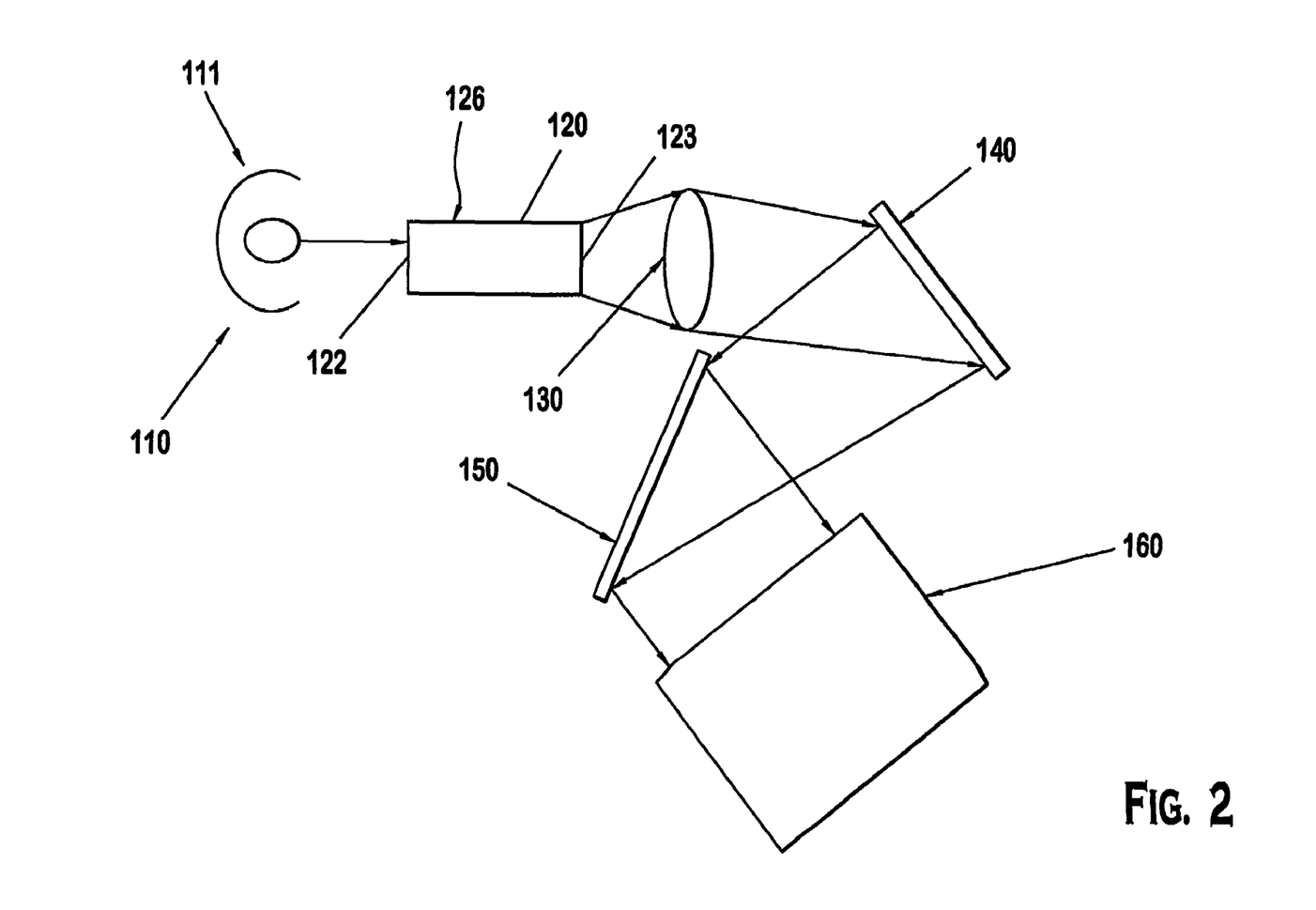
FIG. 2 shows a diagrammatic view of a projection system according to an exemplary embodiment of the invention.
Figure 4:
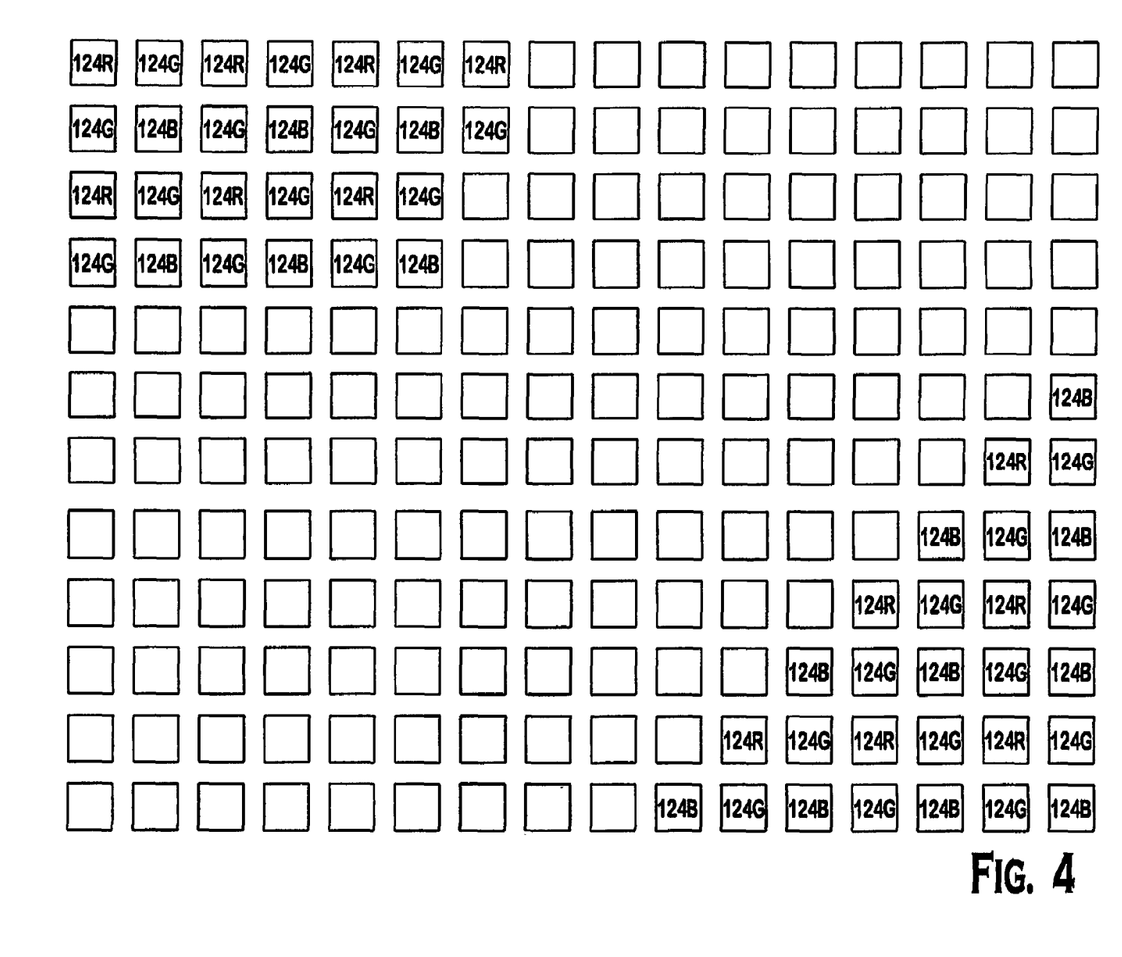
FIG. 4 is an end view of the output end of the integrator of FIGS. 2 and 3 showing a pattern of monochromatic filters on output windows of the integrator.
Figure 5:
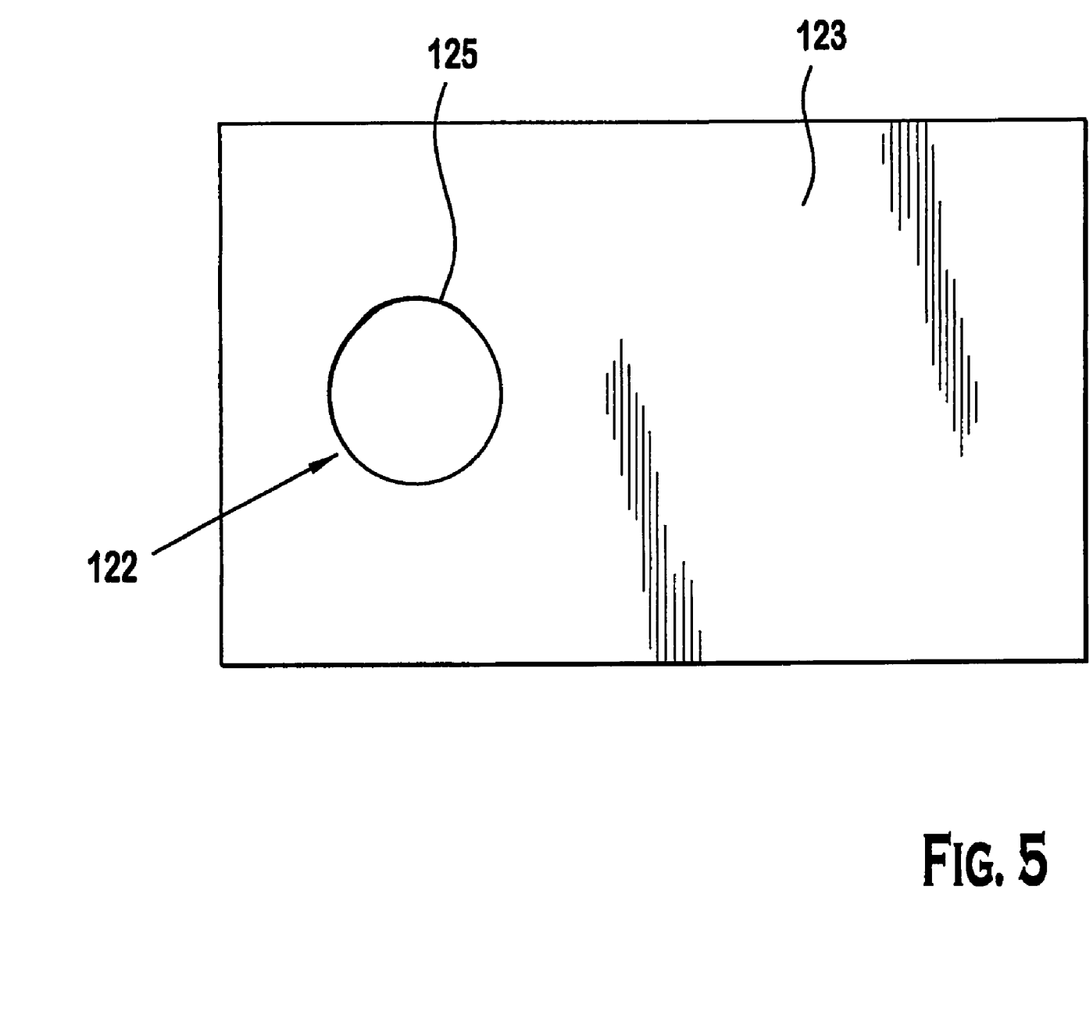
FIG. 5 shows an input window of the integrator of FIG. 3.

The present invention provides a color projection system, such as for a television display, for projecting a video image with enhanced resolution and/or reduced mechanical motion of the projection system due to shifting of a pattern of monochromatic pixels. In an exemplary embodiment, as shown in FIG. 2, white light is generated by a lamp 110 and directed into an integrator 120 by a parabolic reflector 111. In an exemplary embodiment, the lamp 110 is a high intensity multiple wavelength output lamp which is suitable for use in projection display systems. A suitable lamp 110 for this purpose is a UHP lamp that is well known in the art as a light source for projection displays. Light output of the lamp 110 is coupled to an integrator 120. The integrator 120 is a formed as a rectangular cylinder for directing light output of the lamp toward an imager 140 in a given rectangular aspect ratio and size which corresponds with that of the imager 140. In this embodiment, the integrator 120 has a peripheral surface 126, which has a reflective coating such as a silver coating extending substantially around its entirety. Referring to FIG. 5, the input end 122 of the integrator 120 has a similar reflective coating applied selectively to form a transmissive portion 125 through which light from the lamp passes and a reflective portion 123, which reflects light internally within and along the peripheral surface 126. Similarly, referring to FIG. 3 the output end 128 is formed to have a reflective portion 127 and plurality of transmissive portions or windows 123. The windows 123 may be a plurality of apertures through which light is allowed to pass from the interior through the output end 128. Each window 123 has a filter 124 applied thereto for allowing passage of a selected color or band of light while blocking other colors of light from passing therethrough. For example, as shown in FIG. 4, filters 124R allows the passage of red light out of the integrator 120 while filters 124B allows passage of blue light out of the integrator 120 and filters 124G allow the passage of green out of the integrator 120. It can be appreciated by those reasonably skilled in the art therefore that each window 123 may be selected to always transmit the same color light by applying selective filters 124 over selected windows 123. It should be further understood and appreciated that the reflective portions 127 serve to reflect incident light back into the integrator 120 and over the interior surfaces to be eventually redirected once again towards the output end and through windows 123. This serves to conserve illumination and reduce light attenuation through the integrator 120.

Figure 3:
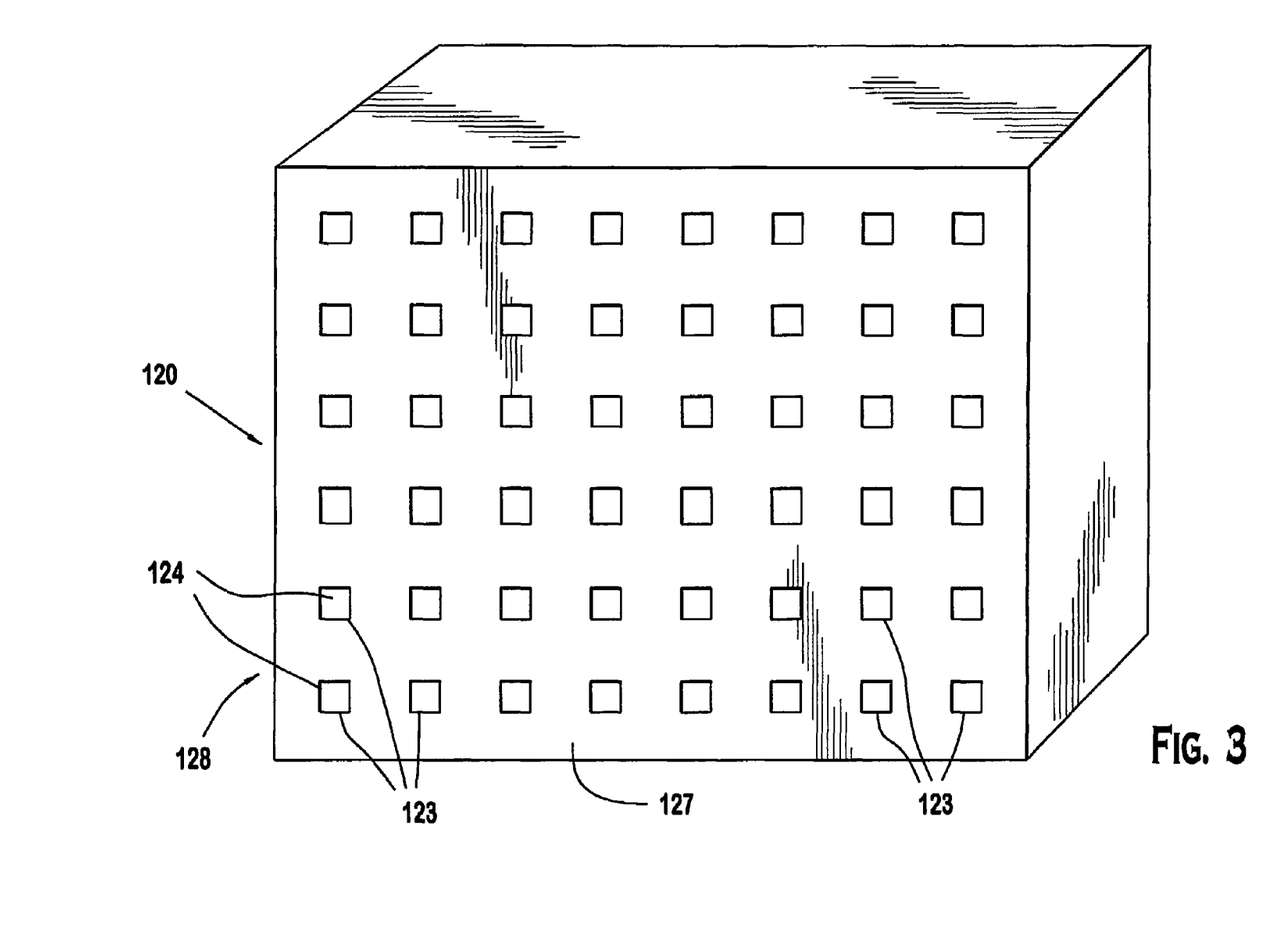
FIG. 3 is an end view of the input end of an integrator from the projection system of FIG. 2.

As shown in FIG. 3, the matrix of output windows 123 are located at the output end 128 of the integrator 120 and arranged in a rectangular grid. Each output window 123 has a monochromatic filter 124 associated with it that transmits a one of the color bands: blue, green and red, while reflecting the other color bands. The monochromatic filters are known in the art, and will not be described herein. The output windows 123 correspond on a one-to-one basis with the micro-mirrors of a DLP imager, which will be described hereafter, and are of a size that is less than or equal to the size of the individual micro-mirrors. Thus, each filtered window passes a pixel of monochromatic light smaller than or equal to the size of an individual micro-mirror.

In an exemplary embodiment, the monochromatic filters 124 are provided in a color pattern, as shown in FIG. 4. The first row of output windows 123 have alternating red filters 124R and green filters 124G, that is, filters that pass or transmit only red and green light, respectively. The second row of output windows 123 have alternating green filters 124G and blue filters 124B, that is, filters that pass or transmit only green and blue light, respectively. The third row is the same as the first row; the fourth row is the same as the second row; and so forth. The filters 124 are positioned such that each red filter 24R and each blue filter 124B is horizontally and vertically adjacent green filters 124G.

Referring again to FIG. 2, the filtered output windows 123 pass a matrix of monochromatic light pixels of varying colors through a relay optics system 130 and onto an imager 140. The imager 140 modulates the matrix of monochromatic light pixels on a pixel-by-pixel basis responsive to a video signal addressed to the imager 140. In the embodiment illustrated and described herein, the imager 140 is a digital micro-display (DMD) and more particularly a DLP imager comprising a rectangular grid of micro-mirrors to alternately deflect the pixel of light incident on the micro-mirror along the projection path or deflect it away from the projection path, depending upon the signal provided for that pixel of the imager. Each micro-mirror is positioned a predetermined number of times (i.e., has a predetermined number of bits in a modulation cycle) to modulate the intensity of that pixel for that frame. The pixel is modulated temporally by the fraction of light that is deflected along the projection path. For example, a micro-mirror with twelve bits in a modulation cycle will be either on or off each of twelve times (i.e., the micro-mirror will be pivoted to the on position or the off position twelve times). A pixel or micro-mirror that has twelve bits and is on six times will project a pixel of light having half of the maximum intensity. Thus, the imager 140 deflects a matrix of temporally modulated monochromatic pixels of light along the projection path of a minimum motion projection system.

Figure 6:
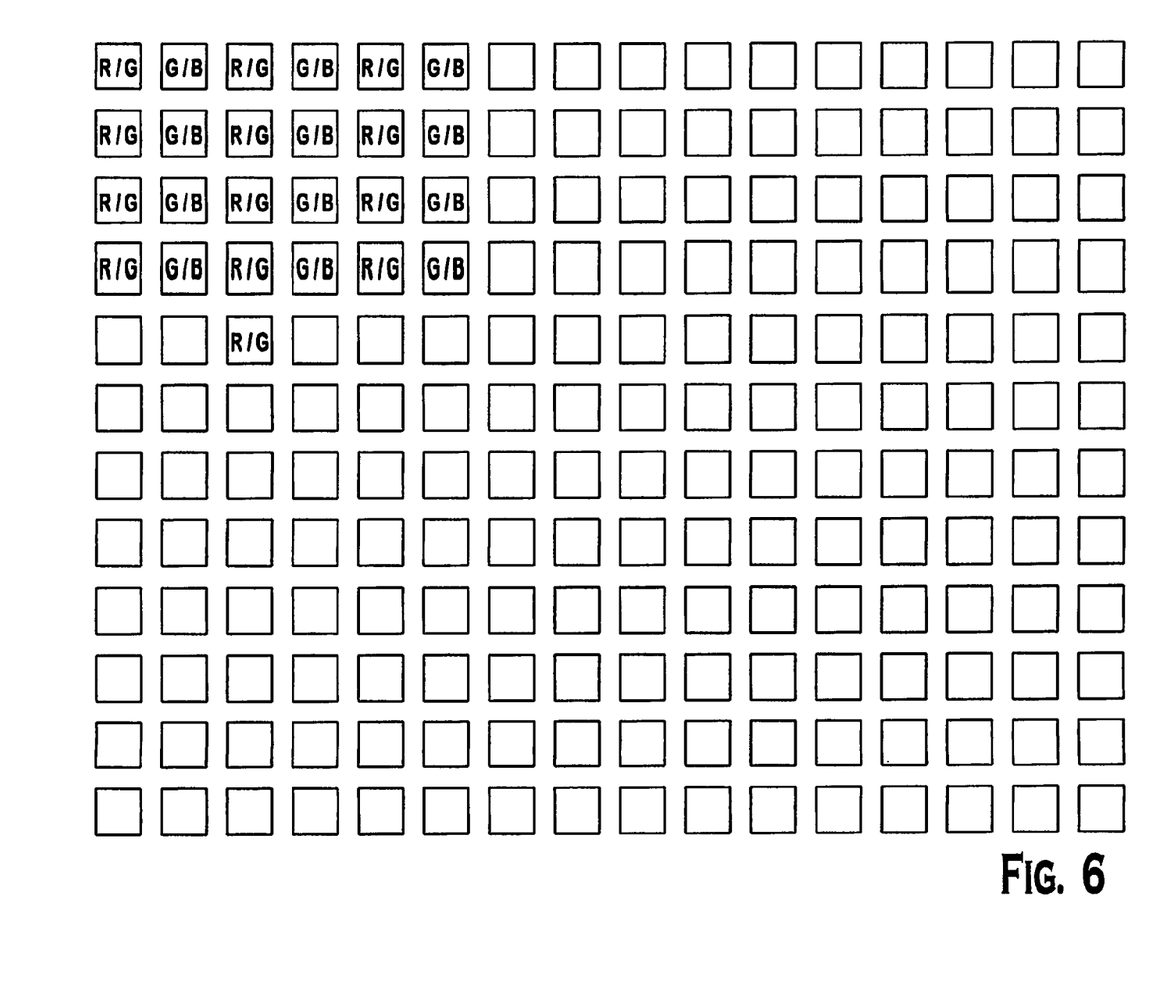
FIG. 6 shows a pattern of overlying pixels projected by the projection system of FIG. 2.

A relay mirror 150 is positioned in the projection path to reflect the matrix of temporally modulated monochromatic pixels of light into a projection lens system 160, which then projects the pixels of light onto a screen (not shown) to form a viewable image. The relay mirror 150 is configured to pivot over a very small angle to offset the pixels vertically one pixel location on the screen. Thus, successive pixels of light at a first pixel location are red then, after the matrix is shifted, green. This shift is performed within a single frame, so that the eye blends the two pixels of light together to form a single pixel of light containing both red and green light. When a solid white image is projected, this pixel will be cyan (R/G) as best shown in FIG. 6. In the adjacent vertical pixel locations successive green and red pixels are projected before and after the mirror is shifted, respectively. In horizontally adjacent pixel locations successive green and blue pixels of light are projected, before and after the mirror is shifted, respectively. Thus, a solid white image will produce alternating columns of cyan (green and red) and yellow (green and blue), as shown in FIG. 6, due to the vertical shifting of pixels by mirror 150. Since the columns are a single pixel in width, they are blended by the eye, and a color image will be projected to produce a full-color image, when adjacent pixels are blended by the eye of a viewer. In this way, the micro-mirrors only need to complete two modulation cycles for each video frame, rather than three, as required to project three different colors on each pixel location. Also, the relay mirror only has to pivot once during a video frame, and a very small adjustment is required to shift the pixels at the screen. This minimum motion arrangement reduces power consumption and increases reliability and, potentially, the frame speed.

Figure 7:
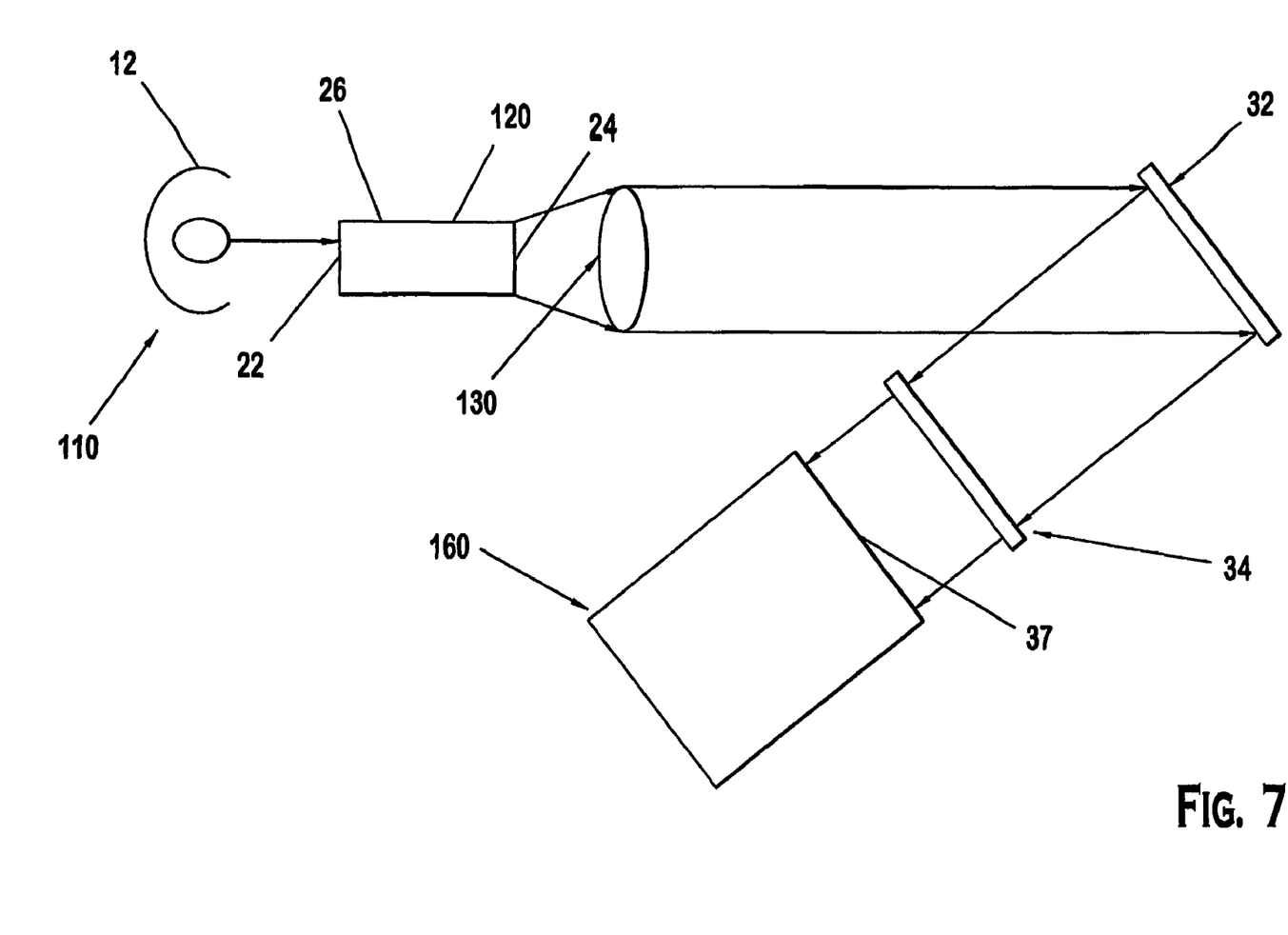
FIG. 7 shows a diagrammatic view of a projection system according to another exemplary embodiment of the invention.

An alternative exemplary embodiment of the present invention is shown in FIG. 7. The alternative projection system includes a lamp 110 for transmitting white light being optically coupled to an integrator 120 which outputs light through an imaging lens 130 to a micro-display 32. Light passes from the micro-display 32 through a shifting plate 34 to a projection lens 160, which outputs images to a screen "not shown". Below, those portions of the system that differ from the previously described embodiment will now be described in greater detail.

The micro-display 32 of this embodiment is a digital light pulse (DLP) micro-display having a plurality of micromirrors each corresponding to a pixel within the projection system. It should be understood that each window 123 having a filter 29 applied on its output is selected to illuminate a particular micromirror of the micro-display 32 always with the same color light. The micro-display 32 is operated to modulate each pixel with the input video signal as is well known in the art. Pixel output of the micro-display 32 is then passed through a shifting plate 34. The shifting plate 34 consists of a light transmissive material of a selected thickness being angularly oriented to the light path and mounted such that it may be pivoted slightly between several output positions. The shifting plate 34 may be pivoted in order to shift the input image a desired amount by refraction, for example one-half or one pixel length on its output. A projection lens 160 receives output from the shifting plate 34 and projects it onto a screen.

Figure 8:
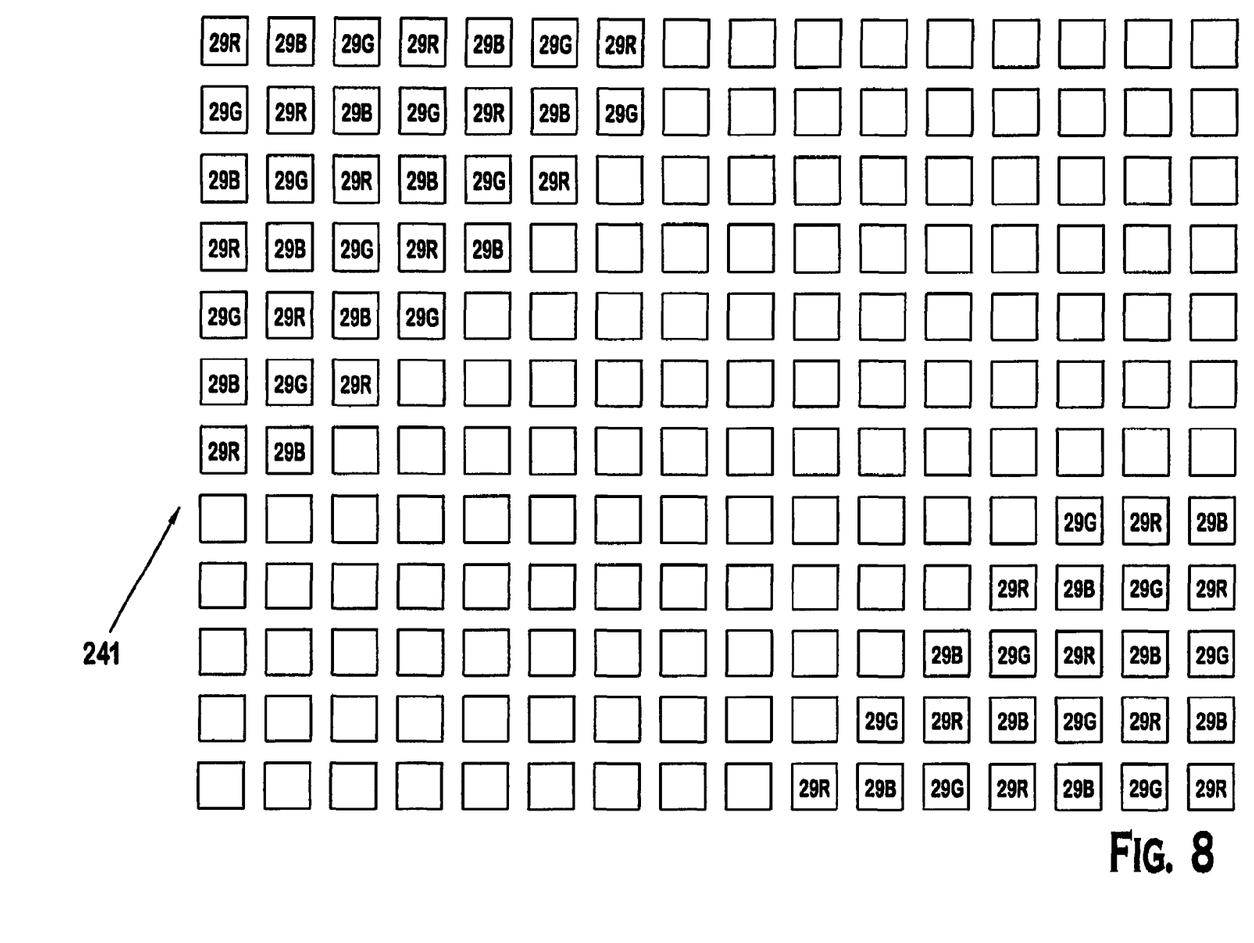
FIG. 8 is an end view of the output end of an integrator for the projection system of FIG. 7 showing a pattern of monochromatic filters on output windows of the integrator.

As shown in FIG. 8, the filters 29 are arranged sequentially such that a red filter 29R is succeeded along a row by a blue filter 29B and then a green filter 29G. The pattern then continues along that row with red, then blue, then green. It should be understood that the array of FIG. 8 is merely illustrative of the sequential nature of the arrangement and that any size array may be created based on the imager and system requirements. The second row begins with a green filter 29G and then proceeds with the same order of colors that being, red, blue, green. Finally, the third row begins with a blue filter 29B and then follows with the same pattern, that is green, red, blue thus populating the entire array with filters.

Figure 9:
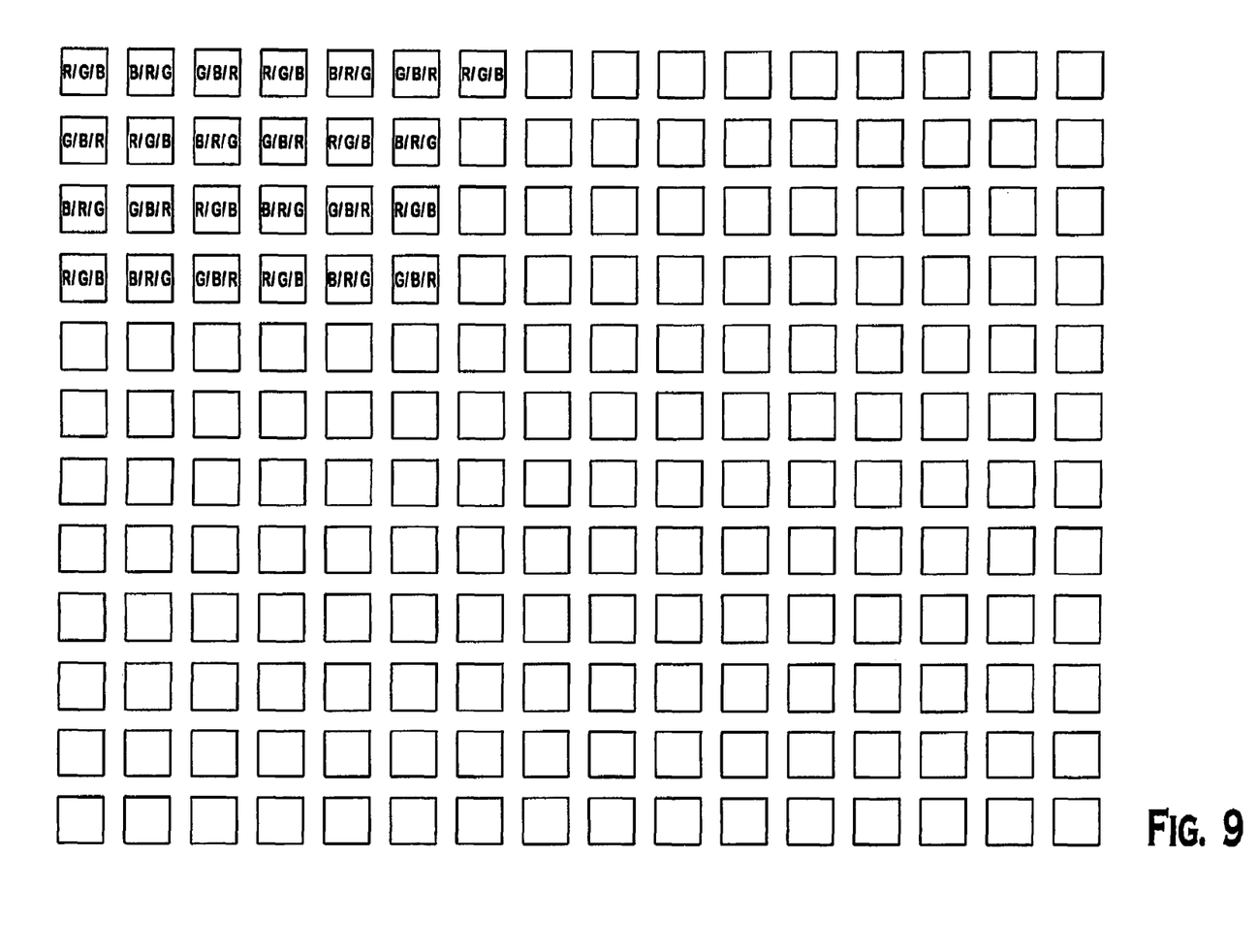
FIG. 9 is a view of the imager output for the projection system of FIG. 7 showing successive color filling.

In use, the micro-display 32 receives a constant color of light at each respective micromirror and then modulates each pixel according to the video input signal. Turning now to FIG. 9, a succession is shown of the projection lens 160 input 37 during successive modulation intervals. In these drawings, R indicates a red pixel, B indicates a blue pixel, and G indicates a green pixel. After a first modulation interval, the shifting plate 34 is tilted slightly causing the light incident on the projection lens 160 to shift by a selected pitch, which in this embodiment is two pixel lengths or one micromirror length. In the second modulation interval the pixel positions that had previously been receiving red light will now receive green light and the pixels previously receiving green light will receive blue light. Similarly, those pixels which had been receiving blue light will be receiving red light. In a third modulation time interval the shifting plate 34 is moved once again such that the light shifts another mirror pitch adding the final primary color to each pixel position. Next, the shifting plate 34 shifts the image back by one pixel pitch or half a micromirror pitch and the process is repeated adding pixels within same rows in between the first ones that had been previously illuminated with each of the three primary colors. This has advantageous result of displaying every other row of pixels with twice as many pixels per row as there are micromirrors per row. The shifting plate 24 may then be shifted downward by one pixel to fill in between the rows by repeating the previous two process steps.

In another alternate embodiment, the filters may be removed to have the output of the integrator configured as shown in FIG. 3 such that the integrator pass all colors of incident light through each window 28 and a color wheel may be added back into the system and located as in FIG. 1. In this embodiment, light colors pass sequentially through the integrator 120 according to the position of the color wheel. The micro-display 32 modulates an entire array of each color within a modulation interval and then modulates an entire array of the next successive color in the successive modulation interval and finally the third color in the next successive modulation interval. This results in each pixel defined by the windows 28 of the integrator being successively illuminated with each color to form a full color image without moving the shifting plate 34. The shifting plate 34 is then tilted or moved to fill in additional pixels defined by the reflective portions 27 on the integrator output for improved resolution.

Figure 10:
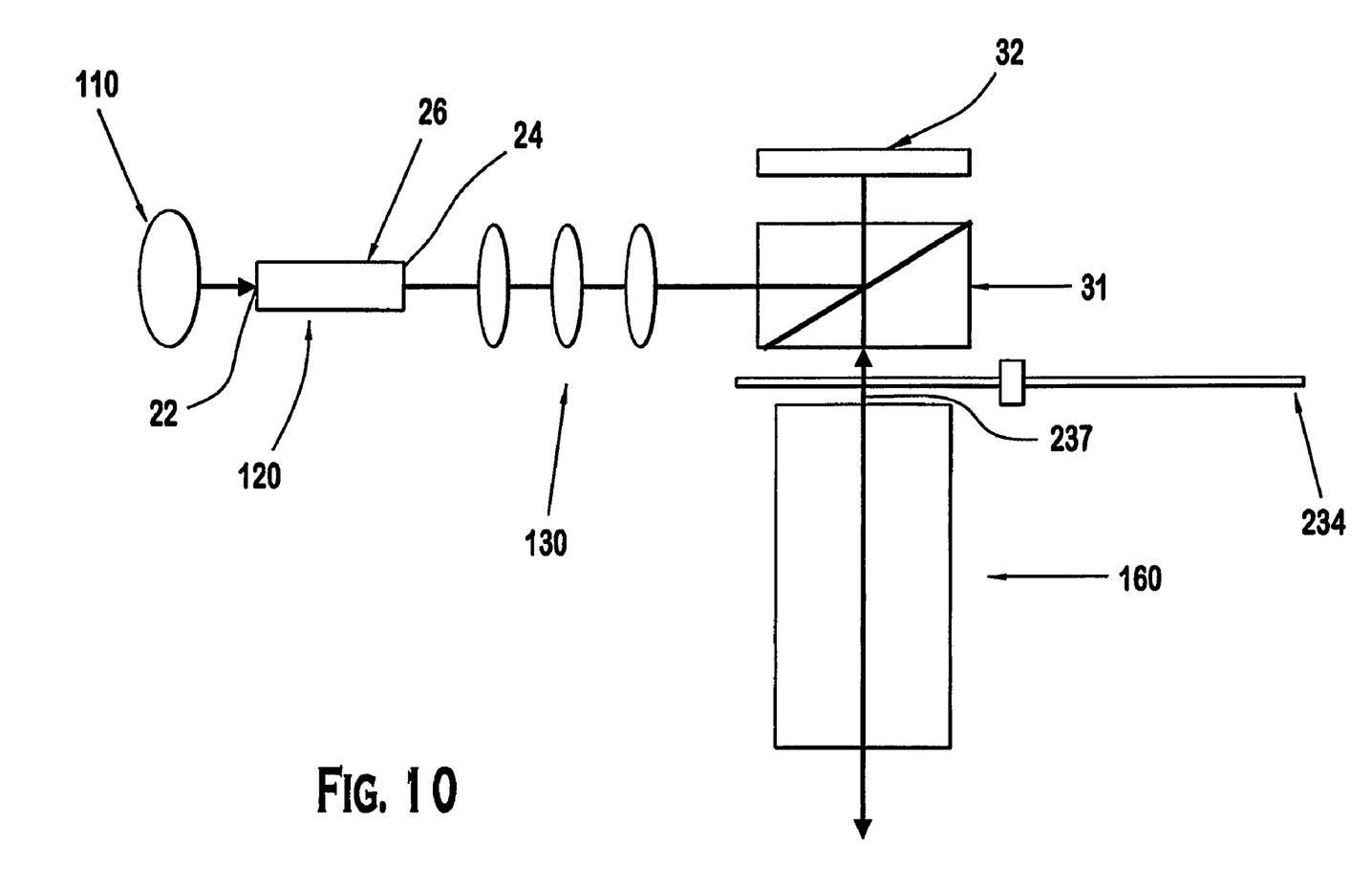
FIG. 10 shows a diagrammatic view of a projection system according to an alternative embodiment of the present invention.

This embodiment advantageously allows an array of micromirrors in a micro-display to sequentially illuminate a relatively larger array on a projection lens thus improving resolution of the system In yet another alternate embodiment, shown in FIG. 10, a projection system includes a lamp 110 for transmitting white light being optically coupled to an integrator 120, which outputs light through an imaging lens array 130 to a TIR prism 31 and onto a micro-display 32. Light passes from the micro-display 32 through the TIR prism 31 to one or more pixel shift wheels 234 and on to a projection lens 160, which outputs images to a screen (not shown). The unique components of this projection system will now be described in greater detail.

The lamp 110, integrator 120, relay lenses 130, micro-display 32, and projection lenses 160 are the same as is shown in FIG. 7 and described above. The TIR prism is similar to the TIR prism shown in FIG. 1 and described above.

Figure 11:
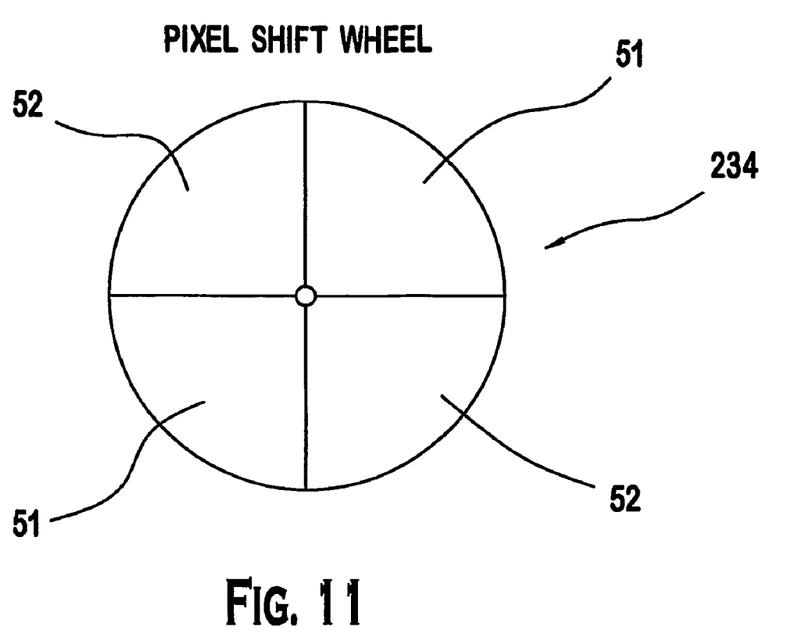
FIGS. 11 and 12 are a plan view and side view, respectively, of a pixel shift wheel from the projection system of FIG. 10.

Instead of a shift plate 34, as shown in FIG. 7 and described above, the present embodiment has a shift wheel 234 that functions to shift discrete pixels of monochromatic light by refraction. As shown in FIG. 11, the one or more pixel shift wheel 234 comprises one or more refracting segments 52 separated one from the other in an angular direction by one or more non-refracting segments 51. The pixel shift wheel 234 shifts the position of all of the pixels modulated by the micro-display 32 to sequentially position adjacent pixels of other colors onto the same pixel positions in order to get all three primary colors on every pixel position, thereby reducing color separation artifacts.

Figure 12:
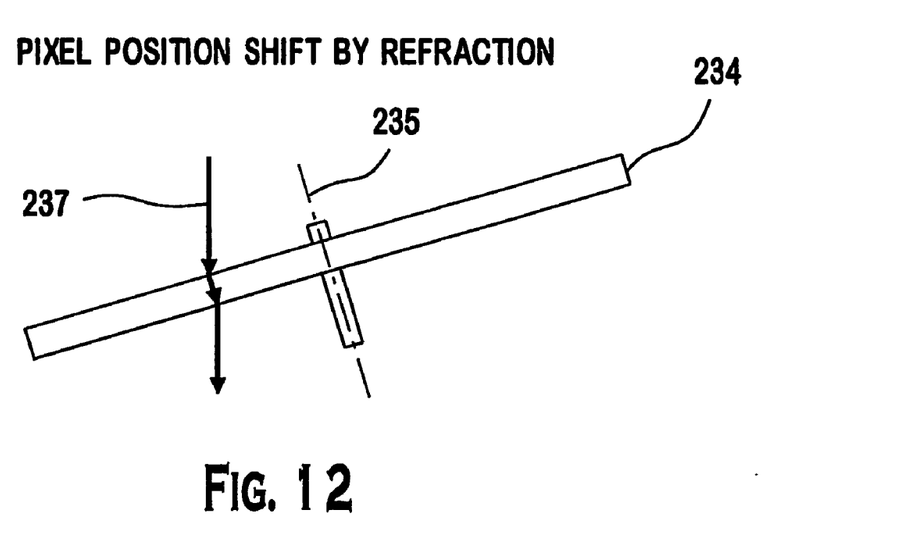

As shown in FIG. 12, the pixel shift wheel 234 rotates on an axis 235 which is not parallel to the light output 237 from the micro-display 32. Instead, the pixel shift wheel 235 is angled with respect to the light output 237, causing the light output to be refracted, shifting the position of each of the pixels in the light output 237. Moreover, the pixel shift wheel 234 shifts the position of all of the pixels by about the same amount and direction depending on the properties of each refracting segment 52. As the pixel shift wheel 234 turns or rotates about axis 235, a different angular segment of the wheel is positioned in the path of the light output 237, producing a different shift direction and/or amount. The amount and or direction of shift depend on the resolution of the one or more refracting segments, through which the light output 237 travels. If the shift takes place at a sufficiently high frequency, the eye will integrate the results from all the shifted pixel positions. A projection lens 160 receives light output 237 after it has passed through one or more shift wheel 234 and projects it onto a screen (not shown). In addition, the resolution of the displayed image can be enhanced by spatially shifting the pixels to positions between each of the pixel positions for the non-shifted image.

In use, the micro-display 32 of FIG. 10 receives a constant color of light at each respective micromirror, due to the pattern of filters as shown in FIG. 8, The micro-display 32 then modulates each pixel according to the video input signal. Turning now to FIG. 9, a succession is shown of the projection lens input (i.e., the light output 237 after passing through the pixel shift wheel 234), during successive modulation intervals. In these drawings, R indicates a red pixel, B indicates a blue pixel, and G indicates a green pixel. When a non-refracting segment 51 is aligned with the light output 237, the individual pixels enter the projection lens, without being shifted. After the non-refracting segment 51, the pixel wheel 234 is rotated so that a first refracting segment 52 is aligned with the light output 237, causing the light incident on the projection lens 160 to shift by a selected pitch, which in this embodiment is two pixel lengths. For the first refracting segment 52, the pixel positions that have previously been receiving red light will now receive green light, and the pixels that have been receiving green light will receive blue light. Similarly, those pixels which have been receiving blue light before the rotation of the pixel shift wheel 234, will be receiving red light. For a second refracting segment 52, different from the first refracting segment, the pixel shift wheel 234 rotates once again such that the light shifts to add the final primary color to each pixel position.

Optionally, a third refracting segment (not shown) on one or more pixel shift wheels 234 shifts the image back by one pixel pitch or about half a micromirror pitch and the process is repeated adding pixels within the same rows between the first ones that had been previously illuminated with each of the three primary colors. This has the advantageous result of displaying every other row of pixels with twice as many pixels per row as there are micromirrors per row. A fourth refracting segment (not shown) on one or more pixel shift wheels 234 may then be shifted downward by one pixel pitch to fill in between rows by repeating the previous process steps.

In an alternative embodiment, the filters may be removed to have the output of the integrator pass all colors of incident light through each window 28 and a color wheel may be added back into the system and located as in FIG. 1. In this embodiment, light colors pass sequentially through the integrator 120 according to the position of the color wheel. The micro-display 32 modulates an entire array of one color within a modulation interval and then modulates an entire array of the next successive color in the succeeding modulation interval, and finally, the third color is modulated in the next modulation interval. This results in each pixel defined by the windows 28 of the integrator 120 being successively illuminated with each color to form a fill color image using the one or more pixel shift wheel 234 as described above to improve resolution.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A projection system, comprising:
   an integrator with an output end;
   a matrix of output windows at the output end of the integrator;
   a pattern of red, green and blue monochromatic filters on the matrix of output windows passing a matrix of red, green, and blue monochromatic pixels of light;
   an imager for modulating the matrix of monochromatic pixels of light; and
   a light shifting device for shifting the matrix of monochromatic pixels of light to temporally form a pattern of overlying monochromatic pixels of light of different colors, viewable as a color image.

2. The projection system of claim 1 wherein the light shifting device is a mirror pivotal over a small angle sufficient to shift the monochromatic pixels of light by one pixel location.

3. The projection system of claim 1 wherein the light shifting device is a shift wheel.

4. The projection system of claim 3 wherein the shift wheel includes angularly successive refracting and non-refracting sections.

5. The projection system of claim 4 wherein the shift wheel rotates about an axis that is at an angle to a light output from the integrator and the refracting sections comprise an optically transmitting material that refracts light incident thereon proportionally to the thickness of the optically transmitting material.

6. The projection system of claim 1 wherein one-fourth of the output windows have a filter of a first color and are essentially equally spaced apart, one-fourth of the output windows have a filter of a second color and are essentially equally spaced apart, one-half of the output windows have a filter of a third color and are essentially equally spaced apart, and each of the windows having a filter of the first and second colors are vertically and horizontally adjacent a window having a filter of the third color.

7. The projection system of claim 6 wherein the first color is red, the second color is blue, and the third color is green.

8. The projection system of claim 1 wherein the pattern of filters comprises alternating rows, the first row having alternating red filters and green filters, the second row having alternating green filters and blue filters, and the red filters and blue filters of each row are vertically adjacent to green filters.

9. The projection system of claim 1 wherein the imager is a DLP micro-display having a rectangular grid of micromirrors.

10. The projection system of claim 9 wherein the output windows are smaller than the micro-mirrors.

11. A projection system comprising:
    a light source;
    an integrator being optically coupled to the light source and having an array of windows at an output end to form an array of discrete pixels of light, wherein each window of the integrator is covered by a filter to project pixels of differing monochromatic light;
    a micro-display being optically coupled to the array of discrete pixels of light for modulating each pixel of light incident on a corresponding position of the micro-display; and
    a pixel shift wheel optically coupled to a light output of the micro-display for temporally shifting the light output and is configured to successively shift different color pixels onto the same position.

12. The projection system of claim 11 wherein the micro-display comprises an array of micromirrors, and each discrete pixel of light from an individual window of the integrator is projected onto and modulated by a corresponding micromirror.

13. The projection system of claim 11 wherein the shift wheel comprises angularly sequential sections including at least one non-refracting section and one or more refracting sections.

14. A projection system comprising:
    a light source;
    an integrator being optically coupled to the light source and having an array of windows at an output end to form an array of discrete pixels of light, wherein each window of the integrator is covered by a filter to project pixels of differing monochromatic light;

a micro-display being optically coupled to the array of discrete pixels of light for modulating each pixel of light incident on a corresponding position of the micro-display; and a shifting plate optically coupled to a light output of the micro-display for temporally shifting the light output and pivotable to successively shift different color pixels onto the same position.

15. The projection system of claim 14 wherein the micro-display comprises an array of micromirrors, and each discrete pixel of light from an individual window of the integrator is projected onto and modulated by a corresponding micromirror.

16. The projection system of claim 14, wherein the shift plate is pivotable to project pixels of light output from the micro-display between the positions of discrete pixels of an array projected by the shift plate at a previous position.

* * * * *